US011348161B2

(12) United States Patent
Chandra Sekar Rao

(10) Patent No.: US 11,348,161 B2
(45) Date of Patent: May 31, 2022

(54) PREDICTION OF ORDER-FULFILLMENT ABEYANCE

(71) Applicant: Dell Products L.P., Round Rock, TX (US)

(72) Inventor: Venkata Chandra Sekar Rao, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 53 days.

(21) Appl. No.: 16/659,768

(22) Filed: Oct. 22, 2019

(65) Prior Publication Data

US 2021/0118040 A1 Apr. 22, 2021

(51) Int. Cl.
*G06Q 30/00* (2012.01)
*G06Q 30/06* (2012.01)
*G06Q 10/06* (2012.01)

(52) U.S. Cl.
CPC ..... *G06Q 30/0637* (2013.01); *G06Q 10/0635* (2013.01)

(58) Field of Classification Search
None
See application file for complete search history.

(56) References Cited

U.S. PATENT DOCUMENTS 8,635,074 B2 * 1/2014 Collins ............... G10L 15/22 704/275
2008/0114643 A1 * 5/2008 Milovina-Meyer .... G06Q 30/04 705/14.13

OTHER PUBLICATIONS

Shaun Snapp, How to Get Around The Problems with Forecasting in SAP ERP, Dec. 1, 2016, https://www.brightworkresearch.com/sapplanning/2016/12/01/forecasting-sap-erp/.
Material Handling & Logistics, think SCM, AI System for Forecasting, Oct. 15, 2017, https://www.mhlnews.com/new-products/ai-system-forecasting.

* cited by examiner

*Primary Examiner* — Mila Airapetian
(74) *Attorney, Agent, or Firm* — Terrile, Cannatti & Chambers, LLP; Emmanuel A. Rivera

(57) ABSTRACT

Technology that facilitates prediction of order-fulfillment abeyance are disclosed. Exemplary implementations may: obtain order details of an inchoate order from an orderer; predict that the inchoate order, upon submission, would be have its fulfillment held in abeyance; and in response to the abeyance prediction, disable submission of the inchoate order with the obtained order details.

20 Claims, 5 Drawing Sheets

PREDICTION OF ORDER-FULFILLMENT ABEYANCE

BACKGROUND

Generally, order fulfillment is a term that describes the complete process in a logistics-production system of sale of goods to a customer. Typically, that process begins with a product or sales inquiry and ends with delivery of goods to the customer. Order fulfillment is part of the broader supply chain process.

SUMMARY

One aspect of the present disclosure relates to a system configured to facilitate prediction of order-fulfillment abeyance. The system may include one or more hardware processors configured by machine-readable instructions. The processor(s) may be configured to obtain order details of an inchoate order from an orderer. The processor(s) may be configured to predict that the inchoate order, upon submission, would be have its fulfillment held in abeyance. The processor(s) may be configured to, in response to the abeyance prediction, disable submission of the inchoate order with the obtained order details.

Another aspect of the present disclosure relates to a method that facilitates prediction of order-fulfillment abeyance. The method may include obtaining order details of an inchoate order from an orderer. The method may include predicting that the inchoate order, upon submission, would be have its fulfillment held in abeyance. The method may include, in response to the abeyance prediction, disable submission of the inchoate order with the obtained order details.

Yet another aspect of the present disclosure relates to a computing platform configured to facilitate prediction of order-fulfillment abeyance. The computing platform may include a non-transient computer-readable storage medium having executable instructions embodied thereon. The computing platform may include one or more hardware processors configured to execute the instructions. The processor(s) may execute the instructions to obtain order details of an inchoate order from an orderer. The processor(s) may execute the instructions to predict that the inchoate order, upon submission, would be have its fulfillment held in abeyance. The processor(s) may execute the instructions to, in response to the abeyance prediction, disable submission of the inchoate order with the obtained order details.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
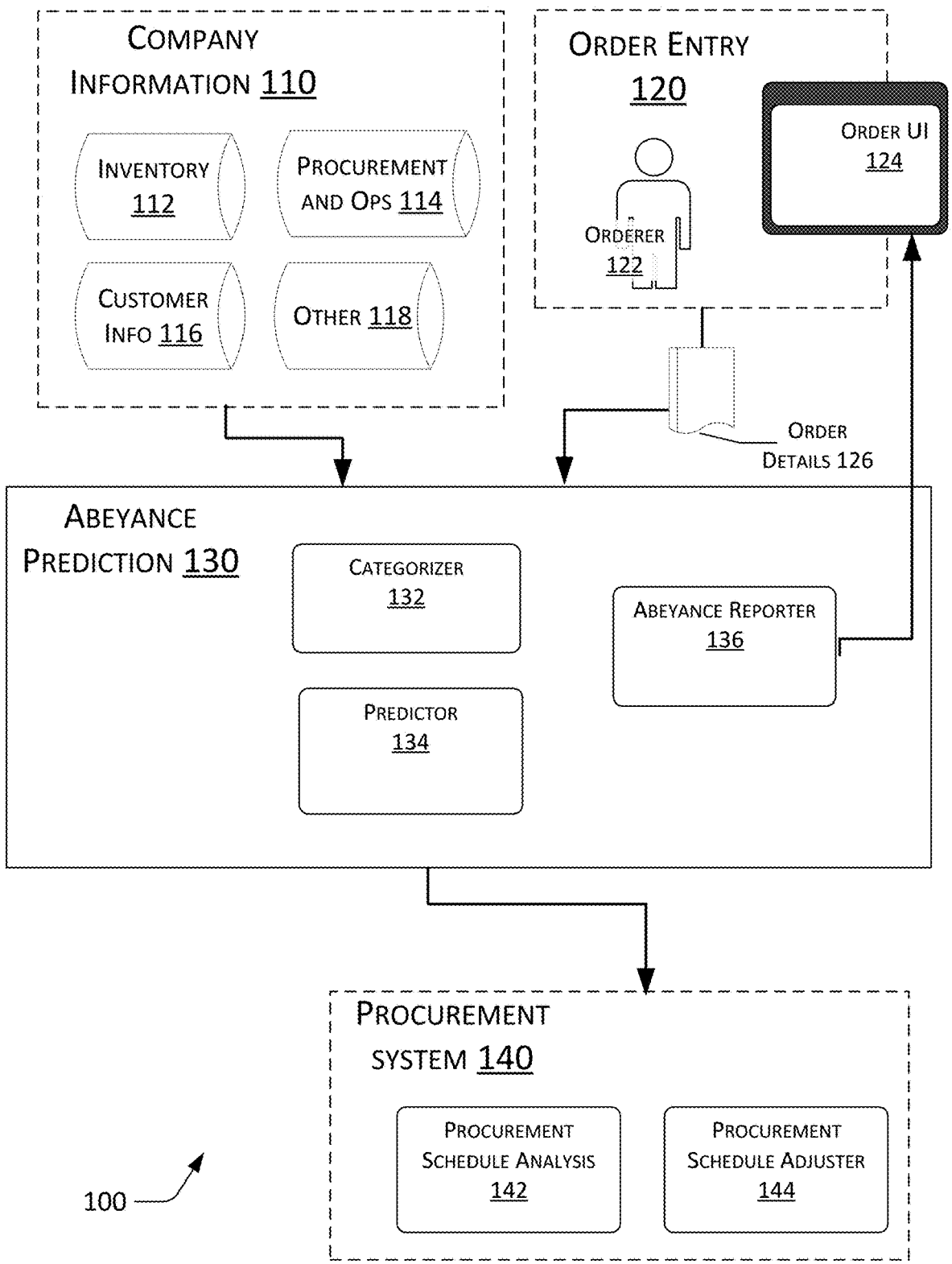
FIG. 1 illustrates an example scenario suitable to employ with an example system that is configured to facilitate prediction of order-fulfillment abeyance, in accordance with one or more implementations.

A technology that facilitates prediction of order-fulfillment abeyance are disclosed herein. Exemplary implementations may: obtain order details of an inchoate order from an orderer; predict that the inchoate order, upon submission, would be have its fulfillment held in abeyance; and in response to the abeyance prediction, disable submission of the inchoate order with the obtained order details.

To obtain a competitive advantage and serve their customers well, a company may wish to have an efficient and effective order-fulfillment process. There are many steps to the order fulfillment process. An example order-fulfillment process may include (but are not limited to):

Product or sales inquiry—Initial inquiry about offerings, visit to the website, catalog request, etc.

Placing the order—this usually includes a financial quote, order configuration (e.g. selections of options); and order booking (the formal order placement or closing of deal)

Order acknowledgment/Confirmation—Confirmation that the order is booked and/or received Invoicing/billing—The presentment of the commercial invoice/bill to the customer Order sourcing/Planning—Determining the source/location of item(s) to be shipped Order processing—Process step where the distribution center or warehouse is responsible to fill order (receive and stock inventory, pick, pack and ship orders).

Shipment—The shipment and transportation of the goods

Track and trace—Determine the current and past locations of the goods during transit Delivery—The delivery of the goods to the consignee/customer Settlement—The payment of the charges for goods/services/delivery At times, there are inefficiencies or other problems with any or all of these example steps that cause a delay or cancelled fulfillment of the order. Herein, when an order fulfillment is delayed or cancelled, that order is held in abeyance.

Indeed, an order-fulfillment abeyance may be unavoidably delayed or cancelled because of inefficiencies or limitations. For example, if a customer places a significantly large order, there may not be a sufficient supply of parts in the supply chain to fulfill that order at all or within a given timeframe.

Herein, this unavoidable type order-fulfillment abeyance is caused by a limitation or disruption in the logistics and/or supply chain. This may be caused by circumstances or situations that are outside the control of the customer. Rather, the circumstances or situations may be under the control of the company from which the items are being ordered. That is, the company could have changed the circumstances or situations if they could have predicted them or something like them.

Often, the order-fulfillment abeyance is not known until the order is formally and officially placed. The customer may believe that their order was successfully placed and that it will be fulfilled in a timely manner. However, the customer is later informed otherwise, for example, once it is discovered that there are insufficient parts in the supply chain to fulfill their order in a timely manner or at all.

In other instances, there may be particular details about the order and/or the customer that make order fulfillment too risky. In that situation, the company may choose to place the order "on hold" until more information is acquired that can allay the risk. As used herein, an order is "on hold" when its fulfillment has been postponed, delayed, or cancelled in response to a risk assessment. This is a type or form of order-fulfillment abeyance.

For example, a company may place an order on hold in response to the customer having reached a designated credit limit. The company may feel that it is too risky to extend credit beyond that limit to the customer. Thus, in response, place their order on hold. Other examples of situations where the risk may be great enough to place the order fulfillment on hold includes: the customer failing a credit check; a history of too many failed transactions; inaccuracy in customer contact information and/or customer personal identification number; tax exemption; having past due balance, and the like.

FIG. 1 is an illustration of an example system 100 that implements the technology described herein that facilitates the prediction of order-fulfillment abeyance. As depicted, the example system 100 includes company information databases 110, order entry system 120, an abeyance prediction system 130, and a procurement system 140.

The company information 110 is one or more sources or databases of information that is relevant to an order. For example, inventory database 112 contains information about the current inventory of items (e.g., goods, products, etc.) that may be ordered, parts, and/or supplies for the manufacture and/or assembly thereof. The procurement and ops (i.e., operations) database 114 contains information about the schedule for procurement of parts, supplies, and/or items. That is, this database contains information about the supply chain. In addition, the procurement and ops database 114 may also contain information about assembly and/or manufacturing of items.

The company information 110 may include customer info (i.e., information) 116, which contains data about the customer and about the customer-company relationship. The other database 118 is a label for other information that may be relevant to the fulfillment of an order to which the company possesses or has access. Examples of such information includes (but is not limited to): sales representative information; supplier information; vendor information; costs of products, items, parts, supplies, and services; margin; locations of suppliers, manufacturing, and distribution; logistics; historical transactional data; MRP (material requirements planning); credit risk; credit limits; product availability; stock keeping unit (or SKU); and orderer's activity and validity.

As used in this context, the company of the company information 110 is the entity with authority over fulfillment over an order. In some instances, they may be called an order fulfiller.

The order entry system 120 is a system or process in which orders are placed with the company. A suitable order entry system 120 may include, for example, a website, a mobile app (i.e., application), a computer application, a messaging center to take orders via a messaging, and a call center to take orders via voice or video communication. Regardless of the particulars of the implementation, the order entry system 120 will have an order UI (i.e., user interface) 124 via which an orderer 122 enters order details 226 into the order entry system 120. Typically, the order UI 124 has interactive fields or input for the orderer 122 to enter the specific order details 126 for the order.

Figure 2:
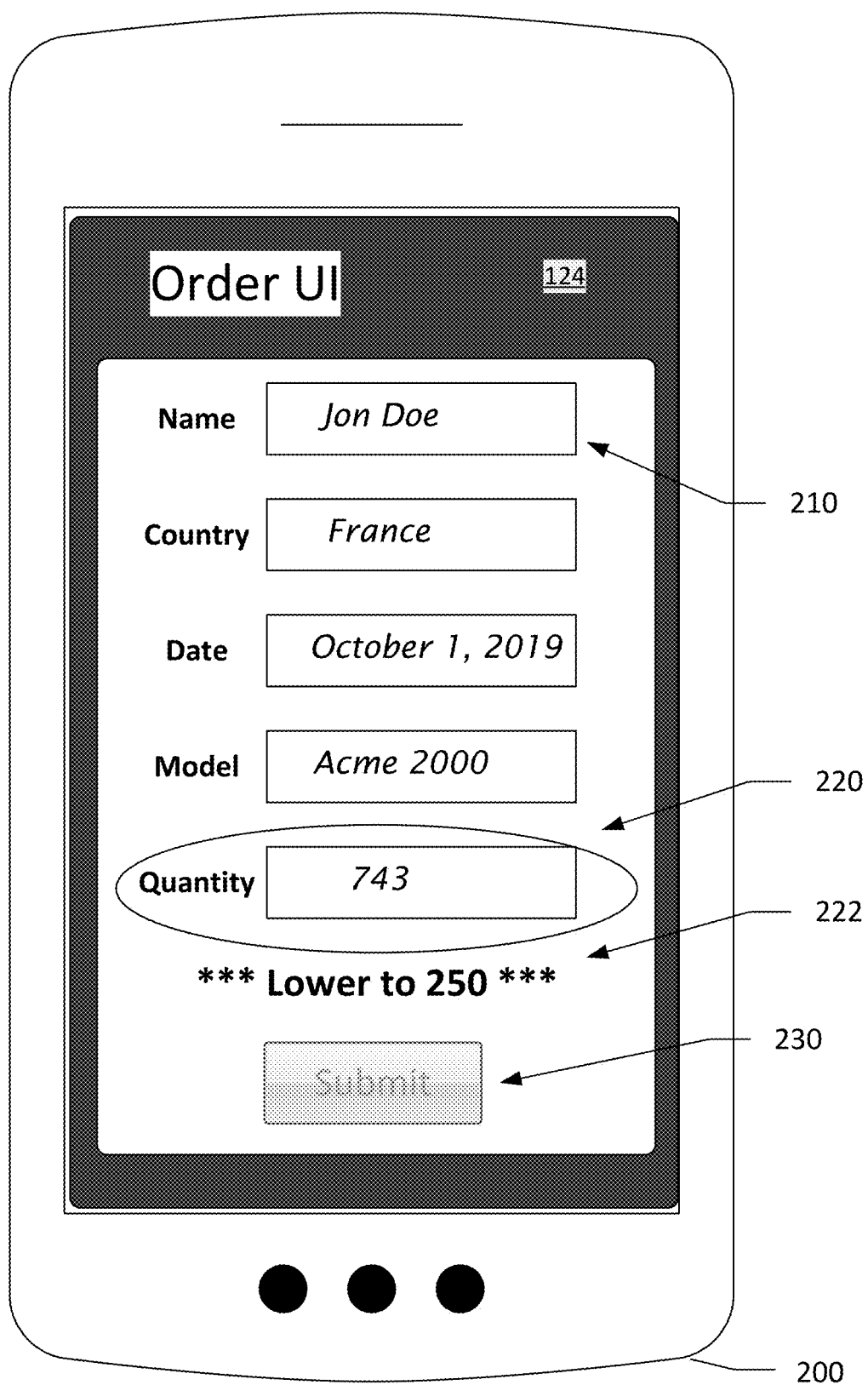
FIG. 2 illustrates an example mobile device presenting an example order user interface (UI) that may be employed with an example system configured to facilitate prediction of order-fulfillment abeyance, in accordance with one or more implementations.

FIG. 2 illustrates an example mobile device 200 with the order UI 124 depicted thereon. As shown in FIG. 2, order UI 124 includes multiple data entry fields, such as name field 210 (in which "Jon Doe" is entered). The entries in these fields are examples of some of the order details 126. The submit button 230 has not yet been pressed. Thus, the order shown on the mobile device 200 is not yet completed. This is an inchoate order.

The order details 126 include the typical details that are often needed or desired for the company to be able to successfully fulfill the order. Examples of such order details 126 include (but are not limited to): orderer identity, orderer contact information, customer identity, customer contact information, shipping information, product ordered, quantity of products ordered, desired delivery date of order, payment information, any balance due, or tax related information.

The order details 126 may also include quote confidence, which is an assessment of the likelihood of the sales inquiry may become an actual formal order. The quote confidence may be supplied by a sales representative that is working with a customer. Alternatively, the quote confidence may be procedurally generated based on weighted values of order details entered for the inchoate order.

An inchoate order is a not-yet completed order. That is, it is an in-process order. An inchoate order exists once an orderer 122 has started an order but has not yet formally submitted or placed the order. Thus, an order is inchoate unless and until both a minimum number of order details have been provided and the customer has chosen to formally submit the order for fulfillment with the company.

As used herein, the orderer 122 is the person entering the order details 126 into the order UI 124 of the order entry 120. The orderer 122 may be a customer, a sales representative of the company, or some other intermediary.

The abeyance prediction system 130 includes a categorizer 132, a predictor 134, and an abeyance reporter 136. The abeyance prediction system 130 obtains the order details 126 of an inchoate order from an orderer 122 and obtains company information 110.

Based on this data, the categorizer 132 may categorize the inchoate order into one or more categories. The first two broad categories here are potential-for-abeyance or no-potential-for-abeyance. If the inchoate order has no potential for abeyance, then the rest of the abeyance prediction system 130 is skipped and the order is fulfilled. Otherwise, the inchoate order has a potential to be abated. Thus, the predictor 134 determines the likelihood that the inchoate order, upon submission, would be have its fulfillment held in abeyance based on the order details 126 alone in some instances or with the company information 110 in other instances.

This categorization may be based on a single factor or a combination of factors. A factor may be part of the order details 126 and/or part of the relevant company information 110. For example, the company may wish to flag large orders. In that case, orders that exceed a given threshold may be categorized as potentially abatable. The particular large-order threshold may vary depending on other factors (such as delivery country, customer, sales representative, model type, etc.).

In some implementations that doesn't use the categorizer 132, the abeyance prediction system 130 passes all inchoate orders to the predictor 134 for an abeyance prediction to be performed. In other implementations that use the categorizer 132, the abeyance prediction system 130 passes only inchoate orders to the predictor 134 that have been categorized to have such a prediction performed.

The predictor 134 predicts whether the inchoate order, upon submission, would be have its fulfillment held in abeyance. In some instances, this prediction may occur when procurement is insufficient to supply sufficient products, parts, and/or supplies to meet the details of the inchoate order, upon submission. In other instances, this abeyance prediction occurs when the inchoate order, upon submission, would be put on hold because of risk assessment. For example, it may be likely that the customer has insufficient credit to complete the purchase.

The predictor 134 is trained using the order details alone or order details with related company information of a multitude of historic and/or generated orders. With the training (e.g., using machine learning), the predictor 134 determines the factors and the weight of those factors that influence whether an order is held in abeyance.

For example, the predictor 134 may be trained by applying multivariate logistic regression approach to find out the coefficient of each contributing attribute. A contributing attribute is a relevant datapoint of the order details and related company information of a multitude of historic and/or generated orders that contributed to a decision to hold an order in abeyance. Below is an example of a multivariate logistic regression approach that may be used to train the predictor 134:

$$x = B0 + B1 \text{ (customer\_number)} + B2 \text{ (Sales\_rep)} + B3 \text{ (Amount)} + B4 \text{ (Quote\_confidence)} + B5 \text{ (Product Line of Business)} + B6 \text{ (Family Parent)} + B7 \text{ (Location)} + B8 \text{ (Quantity)} + B9 \text{ (Build\_Location)}$$

$$P = e^x / 1 + e^x \text{ (Probability of supportability)}$$

$$Q = 1 - P = 1 - (e^x / 1 + e^x)$$

$$P/(1-P) = e^x$$

$$\mathrm{Log}(P/(1-P)) = x$$

Above: x is a value that determines an abeyance prediction decision (e.g., 0 for abeyance and 1 for no abeyance prediction); Bi is a coefficient that indicate weight of the contributing attribute to x; the parenthetical terms are labels for example contributing attributes (where i is an identifying integer); P is the probably of non-abeyance (e.g., supportability); Q is the probability of abeyance (e.g., non-supportability); e is Euler's number, which is a mathematical constant that is the base of the natural logarithm.

Using this training, the predictor 134 determines the proper values for the coefficients (e.g., B0, B1, B2, etc.) for each relevant datapoint of the order details and related company information of a multitude of historic and/or generated orders that contributed to a decision to hold an order in abeyance. The predictor 134 makes its prediction using the order details 126 or an inchoate order alone (or with relevant company information) with the same multivariate logistic regression approach on which it was trained and with the proper values for the coefficients determined during that training.

Of course, other implementations of the predictor 134 may employ other training techniques. Regardless of which technique used, the predictor 134 makes it prediction based on training on using the order details alone or order details with related company information of a multitude of historic and/or generated orders.

In addition, the predictor 134 may identify which particular one or more order details play the greatest role in the order-fulfillment abeyance prediction. For example, the predictor 134 may determine that quantity of items ordered is the most significant factor in causing the abeyance prediction.

This determination can be made by ranking the value of the coefficient applied to the order detail. The largest values are the most important factors. For example, presume that the product of B8(Quantity) yields the greatest value based on the same multivariate logistic regression approach on which it was trained and with the proper values for the coefficients determined during that training. In that case, then quantity is the greatest factor in the abeyance prediction.

Furthermore, the predictor 134 may determine an acceptable value for the one or more greatest factors in the abeyance prediction. This can be may be accomplished by finding an acceptable value (e.g., the largest or smallest value) that changes the abeyance prediction to no abeyance.

In response to an order-fulfillment abeyance prediction, the abeyance reporter 136 disables submission of the inchoate order. That is, the abeyance reporter 136 prevents the completion of the inchoate order as is. For example, the "submit" button 230 on the order UI 124 may gray-out and be unselectable.

The abeyance reporter 136 may provide additional feedback to the orderer 122 via the order UI 124 about which particular order details are problematic. That is, the order UI 124 may highlight the particular entries in the inchoate order that are leading cause or dispositive cause of the abeyance prediction. In addition, the order UI 124 may suggest a change in an entry to correct the abeyance prediction and allow activation of the "submit" button. This is illustrated in FIG. 2 by the highlight 220 of "Quantity 743" and caution message 222 of "Lower to 250." Thus, in this example, the submit button would reactivate once the user changes the quantity to a value of 250 or less. The 250 value is an alternative detail.

As depicted, the order UI 124 of FIG. 2 shows an order entry approach that analyzes the order details of an inchoate order as the details are being entered. If this approach predicts that the values entered will cause the fulfillment of that order to be held in abeyance, then the order-completion capability of the order UI 124 is disabled. Thus, a user cannot complete or submit an order that is likely to not be fulfilled.

However, the user can correct or change the values of the problematic order details. Indeed, this approach identifies the problematic order details on the order UI 124 and, in some instances, suggests an acceptable value or range that will remove the abeyance prediction and re-enable the "submit" button. Thus, the user can complete the order and formally submit it to be fulfilled.

Figure 3:
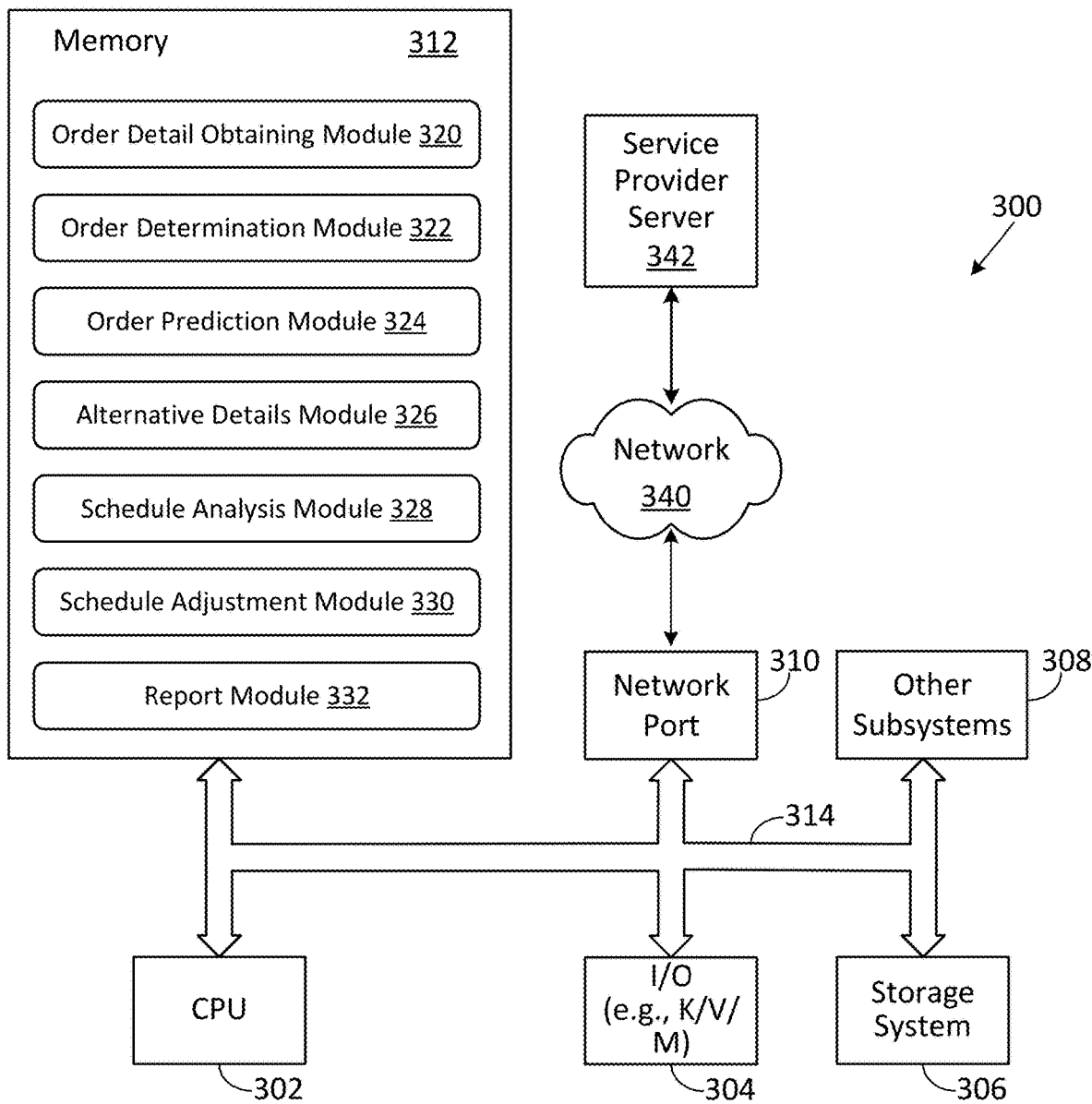
FIG. 3 illustrates an example system configured to facilitate prediction of order-fulfillment abeyance, in accordance with one or more implementations.

FIG. 3 is a generalized illustration of an information handling system that can be used to implement the example system 300. This example system is configured to that facilitates prediction of order-fulfillment abeyance in accordance with one or more implementations.

Order-detail obtaining module 320 may be configured to obtain order details of an inchoate order from an orderer (e.g., customer or sales representative). In some instances, an abeyance prediction may occur when procurement is insufficient to supply sufficient products, parts, and/or supplies to meet the details of the inchoate order, upon submission. In some other instances, an abeyance prediction may occur when the inchoate order, upon submission, would be put on hold because of risk assessment.

Order determination module 322 may be configured to determine that the inchoate order, upon submission, would be exceptional and preforming the abeyance prediction in response to a determination that the order, upon submission, would be exceptional. The order determination module 322 may be implemented as part of the categorizer 132.

Based on the order details 126 alone or in combination with the company details 110, the order determination module 322 may categorize the inchoate order into one or more categories. The first two broad categories here are potential-for-abeyance (i.e., exceptional) or no-potential-for-abeyance (i.e., non-exceptional). If the inchoate order has a potential to be abated (thus is exceptional), the order determination module 322 determines the likelihood that the inchoate order, upon submission, would be have its fulfillment held in abeyance based on the order details 126 alone in some instances or with the company information 110 in other instances.

The exceptional determination may be based on a single factor or a combination of factors. A factor may be part of the order details 126 and/or part of the relevant company information 110. For example, the company may wish to flag large orders. In that case, orders that exceed a given threshold may be categorized as potentially abatable. The particular large-order threshold may vary depending on other factors (such as delivery country, customer, sales representative, model type, etc.).

Some implementations might not use the order determination module 322. In that case, all inchoate orders are processed by the order prediction module 324.

Order prediction module 324 may be configured to predict that the inchoate order, upon submission, would be have its fulfillment held in abeyance.

Alternative details module 326 may be configured to, in response to the abeyance prediction, calculate alternative details that change the abeyance prediction of the inchoate order.

Schedule analysis module 328 may be configured to analyze procurement schedule based on the abeyance prediction. The procurement schedule contains details regarding the acquisition of items (e.g., goods, products, etc.) that may be ordered, and parts, and/or supplies for the manufacture and/or assembly thereof. The procurement schedule may also contain information about the supply chain. In addition, the procurement and ops database 114 may also contain information about assembly and/or manufacturing of items.

Schedule adjustment module 330 may be configured to adjust procurement schedule in response to the analysis of the abeyance prediction. For example, the schedule may be changed to acquire different and/or additional parts, supplies, products, etc. in order to meet an anticipated demand based on orders that fail to be filled because they wind up being held in abeyance.

Report module 332 may be configured to, in response to the abeyance prediction, report the abeyance prediction to the orderer. The report module 332 presents the alternative details (as calculated by the alternative details module 326) to the orderer via an order user interface (UI). The report module 332 may be configured to, in response to the abeyance prediction, disable submission of the inchoate order with the obtained order details.

In some implementations, by way of non-limiting example, order details may be selected from a group consisting of orderer identity, orderer contact information, customer identity, customer contact information, shipping information, product ordered, quantity of products ordered, desired delivery date of order, and payment information.

The example system 300 may include one or more processors configured to execute computer program modules. By way of non-limiting example, the example system 300 may include one or more of a desktop computer, a laptop computer, a handheld computer, a tablet computing platform, a NetBook, a Smartphone, a gaming console, and/or other computing platforms.

Storage system 306 may comprise non-transitory storage media that electronically stores information. The electronic storage media of storage system 306 may include one or both of system storage that is provided integrally (i.e., substantially non-removable) from a computer and/or removable storage that is removably connectable to a computer via, for example, a port (e.g., a USB port, a firewire port, etc.) or a drive (e.g., a disk drive, etc.). Storage system 306 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Storage system 306 may store software algorithms, information determined by processor(s) 302, information received from a server, information received from a client computing platform(s), and/or other information that enables the example routing-script verification system 300 to function as described herein.

Processor(s) 302 may be configured to provide information processing capabilities. As such, processor(s) 302 may include one or more of a digital processor, an analog processor, a digital circuit designed to process information, an analog circuit designed to process information, a state machine, and/or other mechanisms for electronically processing information. Although processor(s) 302 is shown in FIG. 3 as a single entity, this is for illustrative purposes only. In some implementations, processor(s) 302 may include a plurality of processing units. These processing units may be physically located within the same device, or processor(s) 302 may represent processing functionality of a plurality of devices operating in coordination.

Processor(s) 328 may be configured to execute modules 320, 322, 324, 326, 328, 330, and/or 332, and/or other modules. Processor(s) 302 may be configured to execute modules 320, 322, 324, 326, 328, 330, and/or 332, and/or other modules by software; hardware; firmware; some combination of software, hardware, and/or firmware; and/or other mechanisms for configuring processing capabilities on processor(s) 302. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 320, 322, 324, 326, 328, 330, and/or 332 are illustrated in FIG. 3 as being implemented within a single processing unit, in implementations in which processor(s) 302 includes multiple processing units, one or more of modules 320, 322, 324, 326, 328, 330, and/or 332 may be implemented remotely from the other modules. The description of the functionality provided by the different modules 320, 322, 324, 326, 328, 330, and/or 332 described below is for illustrative purposes, and is not intended to be limiting, as any of modules 320, 322, 324, 326, 328, 330, and/or 332 may provide more or less functionality than is described. For example, one or more of modules 320, 322, 324, 326, 328, 330, and/or 332 may be eliminated, and some or all of its functionality may be provided by other ones of modules 320, 322, 324, 326, 328, 330, and/or 332. As another example, processor(s) 302 may be configured to execute one or more additional modules that may perform some or all of the functionality attributed below to one of modules 320, 322, 324, 326, 328, 330, and/or 332.

Figure 4A:
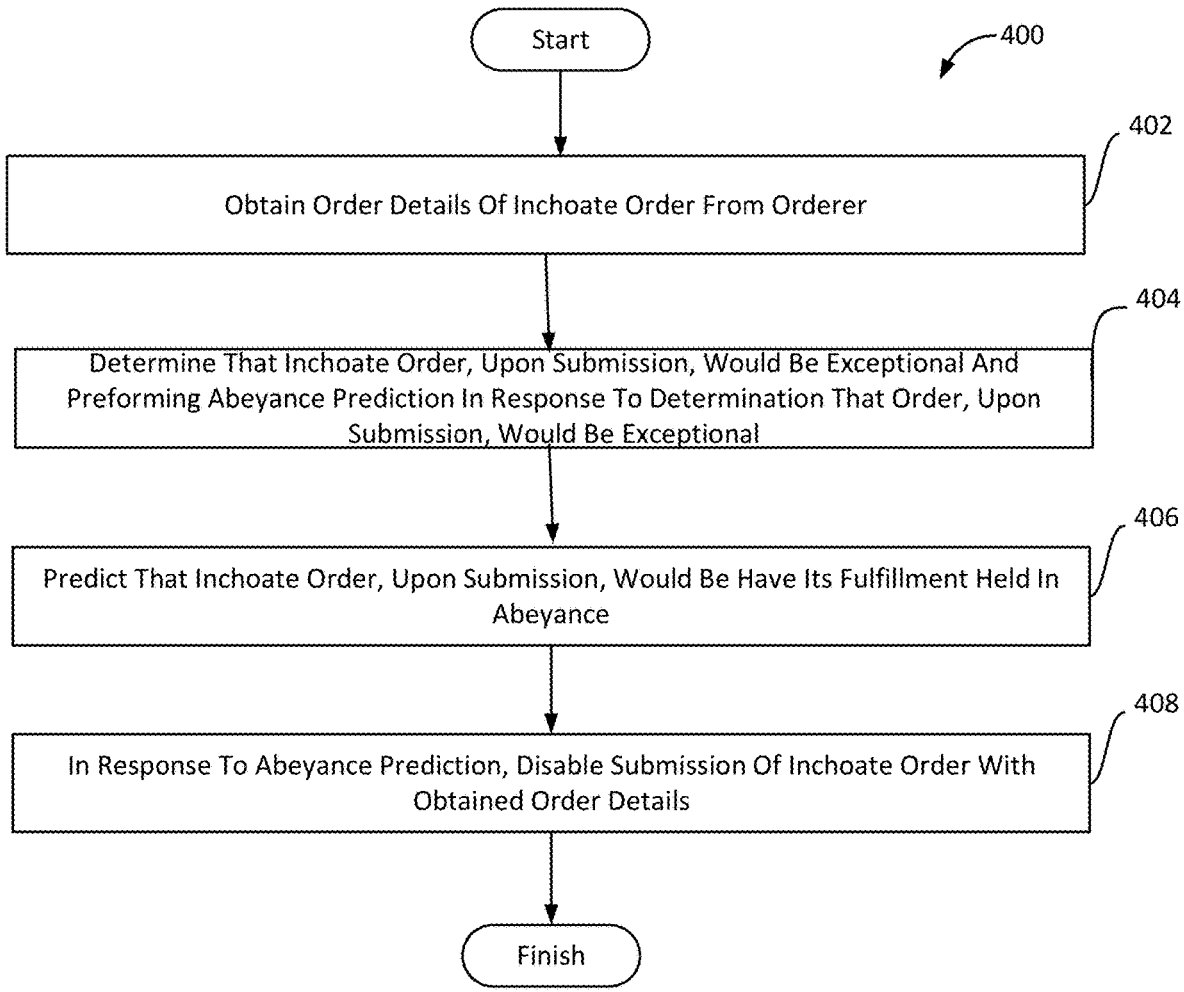
FIGS. 4A, 4B, and/or 4C illustrates a method that facilitates prediction of order-fulfillment abeyance, in accordance with one or more implementations.
Figure 4B:
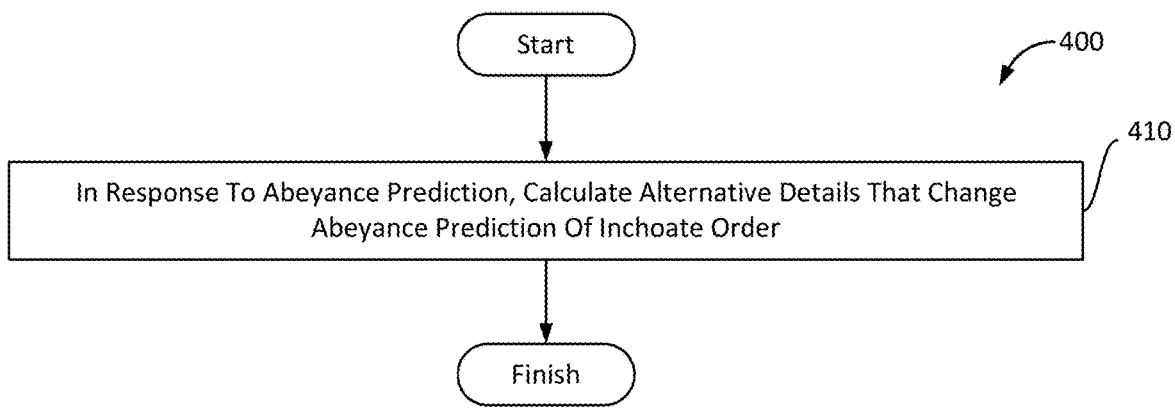

FIGS. 4A, 4B, and/or 4C illustrates a method 400 that facilitates prediction of order-fulfillment abeyance, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A, 4B, and/or 4C and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates method 400, in accordance with one or more implementations.

An operation 402 may include obtaining order details of an inchoate order from an orderer. Operation 402 may be performed by one or more hardware processors configured by machine-readable instructions including a module that is the same as or similar to order-detail obtaining module 320, in accordance with one or more implementations.

An operation 404 may include determining that the inchoate order, upon submission, would be exceptional and preforming the abeyance prediction in response to a determination that the order, upon submission, would be exceptional. Operation 414 may be performed by one or more hardware processors configured by machine-readable instructions including a module that is the same as or similar to order determination module 322, in accordance with one or more implementations.

An operation 406 may include predicting that the inchoate order, upon submission, would be have its fulfillment held in abeyance. Operation 404 may be performed by one or more hardware processors configured by machine-readable instructions including a module that is the same as or similar to order prediction module 324, in accordance with one or more implementations.

An operation 408 may include, in response to the abeyance prediction, disable submission of the inchoate order with the obtained order details. Operation 406 may be performed by one or more hardware processors configured by machine-readable instructions including a module that is the same as or similar to the report module 332, in accordance with one or more implementations.

FIG. 4B illustrates method 400, in accordance with one or more implementations.

An operation 410 may include, in response to the abeyance prediction, calculate alternative details that change the abeyance prediction of the inchoate order. Present the calculated alternative details to the orderer via an order user interface. Operation 408 may be performed by one or more hardware processors configured by machine-readable instructions including a module that is the same as or similar to alternative details module 326, in accordance with one or more implementations.

Figure 4C:
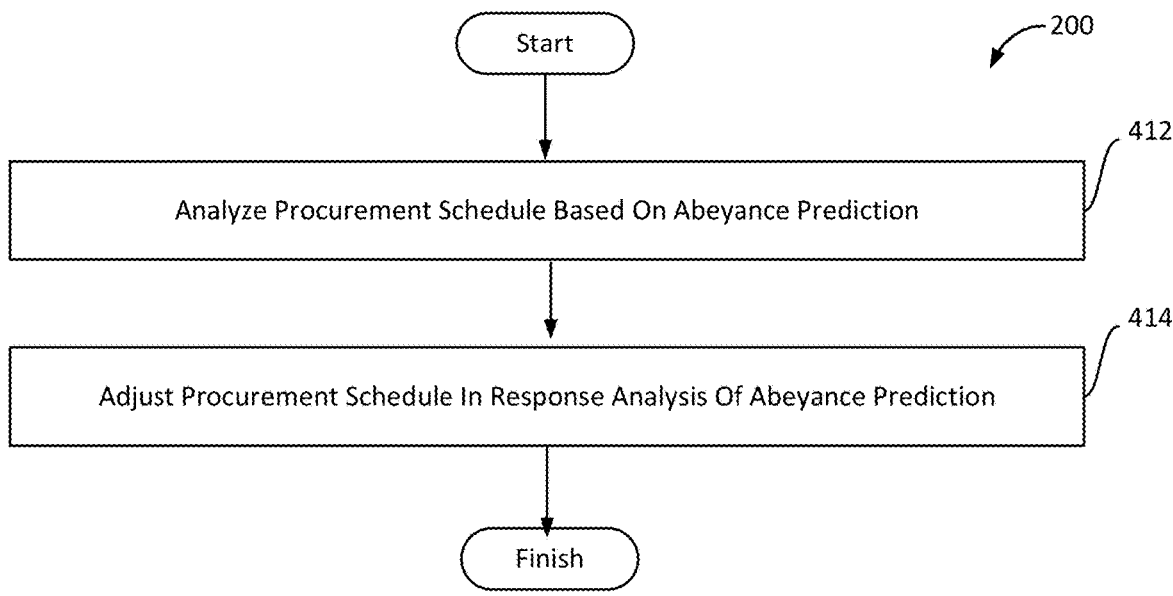

FIG. 4C illustrates method 400, in accordance with one or more implementations.

An operation 412 may include analyzing procurement schedule based on the abeyance prediction. Operation 410 may be performed by one or more hardware processors configured by machine-readable instructions including a module that is the same as or similar to schedule analysis module 328, in accordance with one or more implementations.

An operation 414 may include adjusting procurement schedule in response to the analysis of the abeyance prediction. Operation 412 may be performed by one or more hardware processors configured by machine-readable instructions including a module that is the same as or similar to schedule adjustment module 330, in accordance with one or more implementations.

Additional and Alternative Implementation Notes

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In the above description of example implementations, for purposes of explanation, specific numbers, materials configurations, and other details are set forth in order to better explain the present disclosure. However, it will be apparent to one skilled in the art that the subject matter of the claims may be practiced using different details than the examples ones described herein. In other instances, well-known features are omitted or simplified to clarify the description of the example implementations.

The terms "techniques" or "technologies" may refer to one or more devices, apparatuses, systems, methods, articles of manufacture, and/or executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone, with hardware, and/or with hardware in combination with firmware or software. In the context of software/firmware, the blocks represent instructions stored on one or more non-transitory computer-readable storage media that, when executed by one or more processors or controllers, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

As will be appreciated by one skilled in the art, the technology described herein may be embodied as a method, system, or computer program product. Accordingly, embodiments of the technology described herein may be implemented entirely in hardware or a combination of hardware and software (including firmware, resident software, microcode, etc.) These various embodiments may all generally be referred to herein as a "circuit," "module," or "system." Furthermore, the technology described herein may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the technology described herein may be written in an object oriented programming language such as Java, Smalltalk, C++ or the like. However, the computer program code for carrying out operations of the technology described herein may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the technology described herein are described with reference to flowchart illustrations and/or block diagrams of methods, apparatus (systems) and computer program products according to embodiments of the technology described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The technology described herein is well adapted to attain the advantages mentioned as well as others inherent therein. While the technology described herein has been depicted, described, and is defined by reference to particular embodiments of the technology described herein, such references do not imply a limitation on the technology described herein, and no such limitation is to be inferred. The technology described herein is capable of considerable modification, alteration, and equivalents in form and function, as will occur to those ordinarily skilled in the pertinent arts. The depicted and described embodiments are examples only, and are not exhaustive of the scope of the technology described herein.

Consequently, the technology described herein is intended to be limited only by the spirit and scope of the appended claims, giving full cognizance to equivalents in all respects.

What is claimed is:

1. A system configured that facilitates prediction of order-fulfillment abeyance, the system comprising:
one or more hardware processors configured by machine-readable instructions to:
obtain order details of an inchoate order from an orderer by an abeyance prediction system;
perform machine training on a predictor component using multivariate logistic regression to find coefficients of contributing attributes of order details contributing to a decision performed at the abeyance prediction system to hold an order in abeyance;
predict by the predictor component that the inchoate order, upon submission, would have its fulfillment held in abeyance based on the found coefficients of the contributing attributes; and
in response to the abeyance prediction, disable submission of the inchoate order with the obtained order details by the abeyance prediction system.

2. The system of claim 1, wherein the one or more hardware processors are further configured by machine-readable instructions to:
in response to the abeyance prediction, calculate alternative details that change the abeyance prediction of the inchoate order;
present the calculated alternative details to the orderer via an order user interface.

3. The system of claim 1, wherein the abeyance prediction occurs when procurement is insufficient to supply sufficient products, parts, and/or supplies to meet the details of the inchoate order, upon submission.

4. The system of claim 1, wherein the abeyance prediction occurs when the inchoate order, upon submission, would be put on hold because of risk assessment.

5. The system of claim 1, wherein in response to the abeyance prediction, report the abeyance prediction to the orderer.

6. The system of claim 1, wherein the one or more hardware processors are further configured by machine-readable instructions to:
analyze procurement schedule based on the abeyance prediction;
adjust procurement schedule in response to the analysis of the abeyance prediction.

7. The system of claim 6, wherein the one or more hardware processors are further configured by machine-readable instructions to determine that the inchoate order, upon submission, would be exceptional, and wherein the performance of the abeyance prediction is in response to a determination that the order, upon submission, would be exceptional.

8. A method that facilitates prediction of order-fulfillment abeyance, the method comprising:
one or more hardware processors configured by machine-readable instructions to:
obtain order details of an inchoate order from an orderer by an abeyance prediction system;
perform machine training on a predictor component using multivariate logistic regression to find coefficients of contributing attributes of order details contributing to a decision performed at the abeyance prediction system to hold an order in abeyance;
predict by the predictor component that the inchoate order, upon submission, would have its fulfillment held in abeyance based on the found coefficients of the contributing attributes; and
in response to the abeyance prediction, disable submission of the inchoate order with the obtained order details by the abeyance prediction system.

9. The method of claim 8, further comprising:
in response to the abeyance prediction, calculate alternative details that change the abeyance prediction of the inchoate order;
present the calculated alternative details to the orderer via an order user interface.

10. The method of claim 8, wherein the abeyance prediction occurs when procurement is insufficient to supply sufficient products, parts, and/or supplies to meet the details of the inchoate order, upon submission.

11. The method of claim 8, wherein the abeyance prediction occurs when the inchoate order, upon submission, would be put on hold because of risk assessment.

12. The method of claim 8, wherein in response to the abeyance prediction, report the abeyance prediction to the orderer.

13. The method of claim 8, further comprising:
analyzing procurement schedule based on the abeyance prediction;
adjusting procurement schedule in response to the analysis of the abeyance prediction.

14. The method of claim 13, further comprising:
determining that the inchoate order, upon submission, would be exceptional, and wherein the performance of the abeyance prediction is in response to a determination that the order, upon submission, would be exceptional.

15. A computing platform configured that facilitates prediction of order-fulfillment abeyance, the computing platform comprising:
a non-transient computer-readable storage medium having executable instructions embodied thereon; and
one or more hardware processors configured to execute the instructions to:
obtain order details of an inchoate order from an orderer by an abeyance prediction system via an order user interface (UI);
perform machine training on a predictor component using multivariate logistic regression to find coefficients of contributing attributes of order details contributing to a decision performed at the abeyance prediction system to hold an order in abeyance;
predict by the predictor component that the inchoate order, upon submission, would have its fulfillment held in abeyance based on the found coefficients of the contributing attributes; and
in response to the abeyance prediction, disable submission of the inchoate order with the obtained order details by the abeyance prediction system.

16. The computing platform of claim 15, wherein the one or more hardware processors are further configured by the instructions to:
in response to the abeyance prediction, calculate alternative details that change the abeyance prediction of the inchoate order, present the calculated alternative details to the orderer via an order user interface.

17. The computing platform of claim 15, wherein the abeyance prediction occurs when procurement is insufficient to supply sufficient products, parts, and/or supplies to meet the details of the inchoate order, upon submission.

18. The computing platform of claim 15, wherein the abeyance prediction occurs when the inchoate order, upon submission, would be put on hold because of risk assessment.

19. The computing platform of claim 15, wherein in response to the abeyance prediction, report the abeyance prediction to the orderer via the order UI.

20. The computing platform of claim 15, wherein the one or more hardware processors are further configured by the instructions to:
   analyze procurement schedule based on the abeyance prediction;
   adjust procurement schedule in response to the analysis of the abeyance prediction.

* * * * *